(12) United States Patent
Tian et al.

(10) Patent No.: US 8,107,744 B2
(45) Date of Patent: Jan. 31, 2012

(54) PICTURE BUFFERING FOR PREDICTION REFERENCES AND DISPLAY

(75) Inventors: Dong Tian, Tampere (FI); Miska Hannuksela, Tampere (FI); Ye-Kui Wang, Tampere (FI)

(73) Assignee: Nokia Corporation, Espoo (FI)

(*) Notice: Subject to any disclaimer, the term of this patent is extended or adjusted under 35 U.S.C. 154(b) by 916 days.

(21) Appl. No.: 10/703,109

(22) Filed: Nov. 6, 2003

(65) Prior Publication Data
US 2004/0179619 A1    Sep. 16, 2004

Related U.S. Application Data

(60) Provisional application No. 60/424,409, filed on Nov. 6, 2002, provisional application No. 60/429,953, filed on Nov. 29, 2002, provisional application No. 60/430,712, filed on Dec. 3, 2002.

(51) Int. Cl.
  *G06K 9/36* (2006.01)
  *G06K 9/46* (2006.01)
  *H04N 7/12* (2006.01)
  *H04N 11/02* (2006.01)
(52) U.S. Cl. ............... 382/233; 382/238; 375/240.25
(58) Field of Classification Search ............ None
  See application file for complete search history.

(56) References Cited

U.S. PATENT DOCUMENTS

| | | | |
|---|---|---|---|
| 5,565,924 A * | 10/1996 | Haskell et al. | 348/423.1 |
| 5,652,627 A * | 7/1997 | Allen | 348/497 |
| 5,793,436 A * | 8/1998 | Kim | 348/447 |
| 5,835,149 A | 11/1998 | Astle | |
| 5,909,224 A * | 6/1999 | Fung | 345/531 |
| 5,926,227 A * | 7/1999 | Schoner et al. | 348/512 |
| 5,937,138 A | 8/1999 | Fukuda et al. | |
| 6,028,539 A * | 2/2000 | Matsui | 341/55 |
| 6,212,233 B1 * | 4/2001 | Alexandre et al. | 375/240.03 |
| 6,289,129 B1 * | 9/2001 | Chen et al. | 382/232 |
| 6,459,811 B1 * | 10/2002 | Hurst, Jr. | 382/232 |
| 6,522,693 B1 * | 2/2003 | Lu et al. | 375/240.02 |
| 6,546,050 B2 * | 4/2003 | Ramaswamy | 375/240.03 |
| 6,628,719 B1 * | 9/2003 | Kono et al. | 375/240.28 |
| 6,845,129 B2 * | 1/2005 | Golin | 375/240.02 |
| 6,980,594 B2 * | 12/2005 | Wang et al. | 375/240.12 |
| 7,149,247 B2 * | 12/2006 | Sullivan | 375/240.01 |
| 7,170,938 B1 * | 1/2007 | Cote et al. | 375/240.03 |
| 7,421,508 B2 * | 9/2008 | Hannuksela et al. | 709/231 |
| 2001/0009567 A1 * | 7/2001 | Tsuboi | 375/240.25 |

FOREIGN PATENT DOCUMENTS

RU      2 073 913      2/1997

(Continued)

OTHER PUBLICATIONS

JVT ITU-T Rec. H.264 | ISO/IEC 14496-10, May 2002.*

(Continued)

*Primary Examiner* — Yuzhen Ge (57) ABSTRACT

The invention relates to an encoder for forming an encoded picture stream. The pictures are defined as reference pictures or non-reference pictures, and information relating to decoding order and output order of a picture is defined for pictures of the picture stream. The encoder is arranged to form to the bitstream an indication of such a number of pictures arranged to be buffered in decoding order that is sufficient to recover the output order of pictures. The invention also relates to a signal, hypothetical encoder, decoder, hypothetical decoder, electronic device, system, software program and a storage medium.

26 Claims, 7 Drawing Sheets

FOREIGN PATENT DOCUMENTS

| | | |
|---|---|---|
| RU | 2 216 122 | 11/2003 |
| WO | 99/16252 | 4/1999 |
| WO | 00/59219 | 10/2000 |

OTHER PUBLICATIONS

H.264 and MPEG-4 Video Compression—Video Coding for Next-generation Multimedia, Iain E. G. Richardson, John Wiley and Sons Ltd, Jan. 2004, p. 166.*

"A Flexible Decoder Buffer Model for JVT Video Coding" by J. Ribas-Corbera et al, Conferenece on Image Processing. (ICIP '02) ; Rochester, NY, Sep. 22-25, 2002. Published IEEE Int. Conf. Image Process 2002, vol. 2, pp. II/493-II/496.

Joint Video Team (JVT) of ISO/IEC MPEG & ITU-T VCEG, $2^{nd}$ meeting, Jan. 29-Feb. 1, 2002, (retrieved from the Internet Http//:ftp3.itu.ch/av-arch/video-side/0201Gen/JVT-B050.doc on Jul. 8, 2005, document date on the ITU file server: Jan. 23, 2002).

Russian Office Action Issued Oct. 31, 2006 for Russian Patent Application No. 2005117360 filed Nov. 6, 2003 (Original with English translation).

Japanese Office Action dated Feb. 3, 2009, 3 pages with English translation, 5 pages.

"Description of Hypothetical Reference Decoder (HRD) and Buffering Verifiers" by Miska M. Hannuksela et al; Joint Video Team (JVT) of ISO/IEC MPEG & ITU-T VCEG (ISO/IEC JTC1/SC29/WG11 and ITU-T SG16 Q.6), $3^{rd}$ Meeting, Fairfax, Virginia, May 6-10, 2002, 10 pages.

"Decoded Picture Buffer" by Louis Kerofsky; Joint Video Team (JVT) of ISO/IEC MPEG & ITU-T VCEG (ISO/IEC JT C1/SC29/WG11 and ITU-T SG16 Q.6), $5^{th}$ Meeting, Geneva, CH, Oct. 9-17, 2002, 6 pages.

* cited by examiner

PICTURE BUFFERING FOR PREDICTION REFERENCES AND DISPLAY

CROSS-REFERENCE TO RELATED APPLICATIONS

Priority is claimed from provisional application 60/424,409 filed Nov. 6, 2002, from provisional application 60/429,953 filed Nov. 29, 2002 and from provisional application 60/430,712 filed Dec. 3, 2002.

FIELD OF THE INVENTION

The present invention relates to a picture buffering for prediction references and display, the method comprising an encoding step for forming encoded pictures in an encoder, an optional hypothetical decoding step for decoding said encoded pictures in the encoder, a transmission step for transmitting said encoded pictures to a decoder, a decoding step for decoding the encoded pictures for forming decoded pictures, and rearranging step for arranging the decoded pictures in displaying order.

BACKGROUND OF THE INVENTION

Published video coding standards include ITU-T H.261, ITU-T H.263, ISO/IEC MPEG-1, ISO/IEC MPEG-2, and ISO/IEC MPEG-4 Part 2. These standards are herein referred to as conventional video coding standards.

There is a standardization effort going on in a Joint Video Team (JVT) of ITU-T and ISO/IEC. The work of JVT is based on an earlier standardization project in ITU-T called H.26L. The goal of the JVT standardization is to release the same standard text as ITU-T Recommendation H.264 and ISO/IEC International Standard 14496-10 (MPEG-4 Part 10). The draft standard is referred to as the JVT coding standard in this paper, and the codec according to the draft standard is referred to as the JVT codec.

The optional reference picture selection mode of H.263 and the NEWPRED coding tool of MPEG-4 Part 2 enable selection of the reference frame for motion compensation per each picture segment, e.g., per each slice in H.263. Furthermore, the optional Enhanced Reference Picture Selection mode of H.263 and the JVT coding standard enable selection of the reference frame for each macroblock separately.

Figure 1:
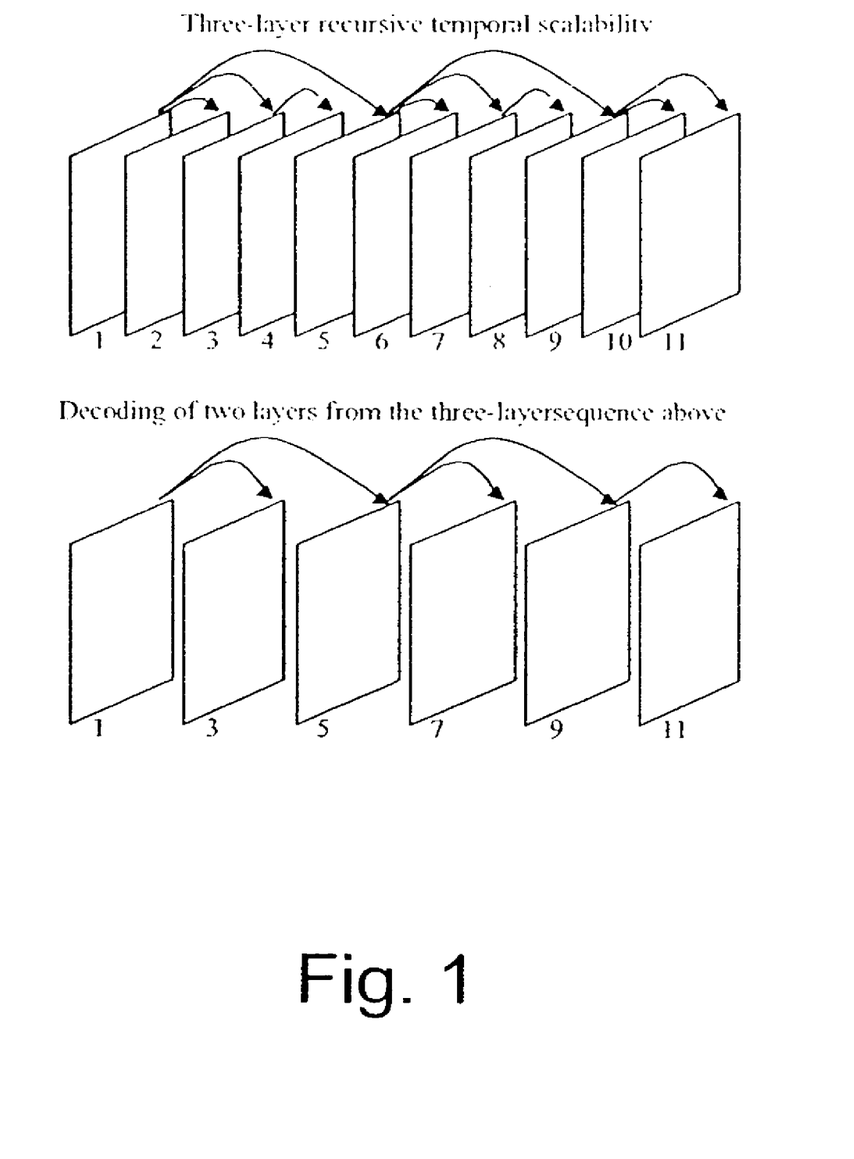
FIG. 1 shows an example of a recursive temporal scalability scheme.
Figure 2:
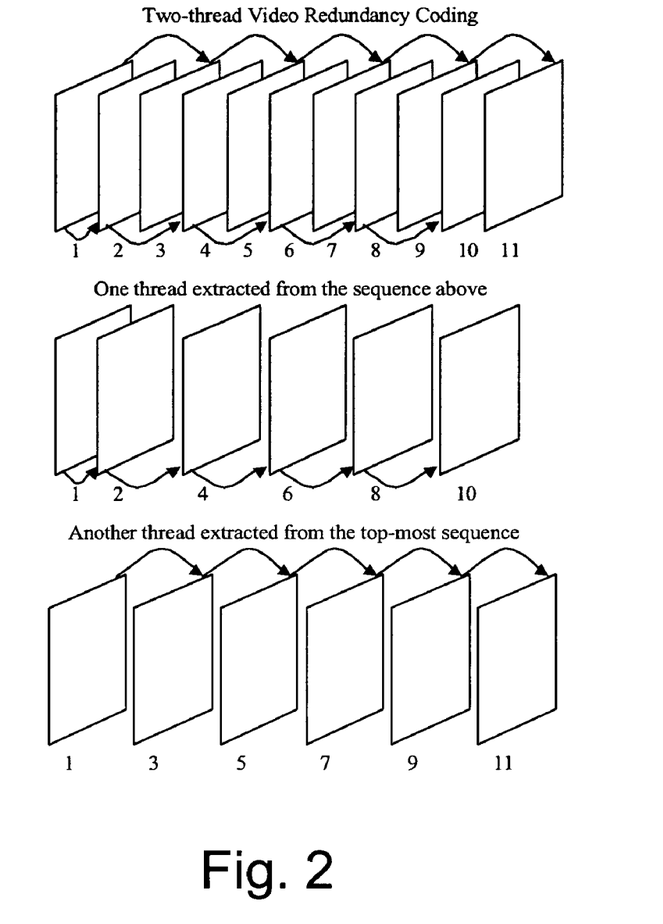
FIG. 2 depicts a scheme referred to as Video Redundancy Coding, where a sequence of pictures is divided into two or more independently coded threads in an interleaved manner.

Reference picture selection enables many types of temporal scalability schemes. FIG. 1 shows an example of a temporal scalability scheme, which is herein referred to as recursive temporal scalability. The example scheme can be decoded with three constant frame rates. FIG. 2 depicts a scheme referred to as Video Redundancy Coding, where a sequence of pictures is divided into two or more independently coded threads in an interleaved manner. The arrows in these and all the subsequent figures indicate the direction of motion compensation and the values under the frames correspond to the relative capturing and displaying times of the frames.

In conventional video coding standards, the decoding order of pictures is the same as the display order except for B pictures. A block in a conventional B picture can be bi-directionally temporally predicted from two reference pictures, where one reference picture is temporally preceding and the other reference picture is temporally succeeding in display order. Only the latest reference picture in decoding order can succeed the B picture in display order (exception: interlaced coding in H.263 where both field pictures of a temporally subsequent reference frame can precede a B picture in decoding order). A conventional B picture cannot be used as a reference picture for temporal prediction, and therefore a conventional B picture can be disposed of without affecting the decoding of any other pictures.

The JVT coding standard includes the following novel technical features compared to earlier standards:
  The decoding order of pictures is decoupled from the display order. The picture number indicates decoding order and the picture order count indicates the display order.
  Reference pictures for a block in a B picture can either be before or after the B picture in display order. Consequently, a B picture stands for a bi-predictive picture instead of a bi-directional picture.
  Pictures that are not used as reference pictures are marked explicitly. A picture of any type (intra, inter, B, etc.) can either be a reference picture or a non-reference picture. (Thus, a B picture can be used as a reference picture for temporal prediction of other pictures.)
  A picture can contain slices that are coded with a different coding type. In other words, a coded picture may consist of an intra-coded slice and a B-coded slice, for example.

Decoupling of display order from decoding order can be beneficial from compression efficiency and error resiliency point of view.

Figure 3:
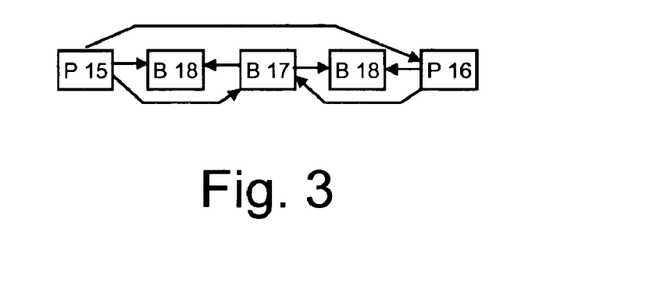
FIG. 3 presents an example of a prediction structure potentially improving compression efficiency.

An example of a prediction structure potentially improving compression efficiency is presented in FIG. 3. Boxes indicate pictures, capital letters within boxes indicate coding types, numbers within boxes are picture numbers according to the JVT coding standard, and arrows indicate prediction dependencies. Note that picture B17 is a reference picture for pictures B18. Compression efficiency is potentially improved compared to conventional coding, because the reference pictures for pictures B18 are temporally closer compared to conventional coding with PBBP or PBBBP coded picture patterns. Compression efficiency is potentially improved compared to conventional PBP coded picture pattern, because part of reference pictures are bi-directionally predicted.

Figure 4:
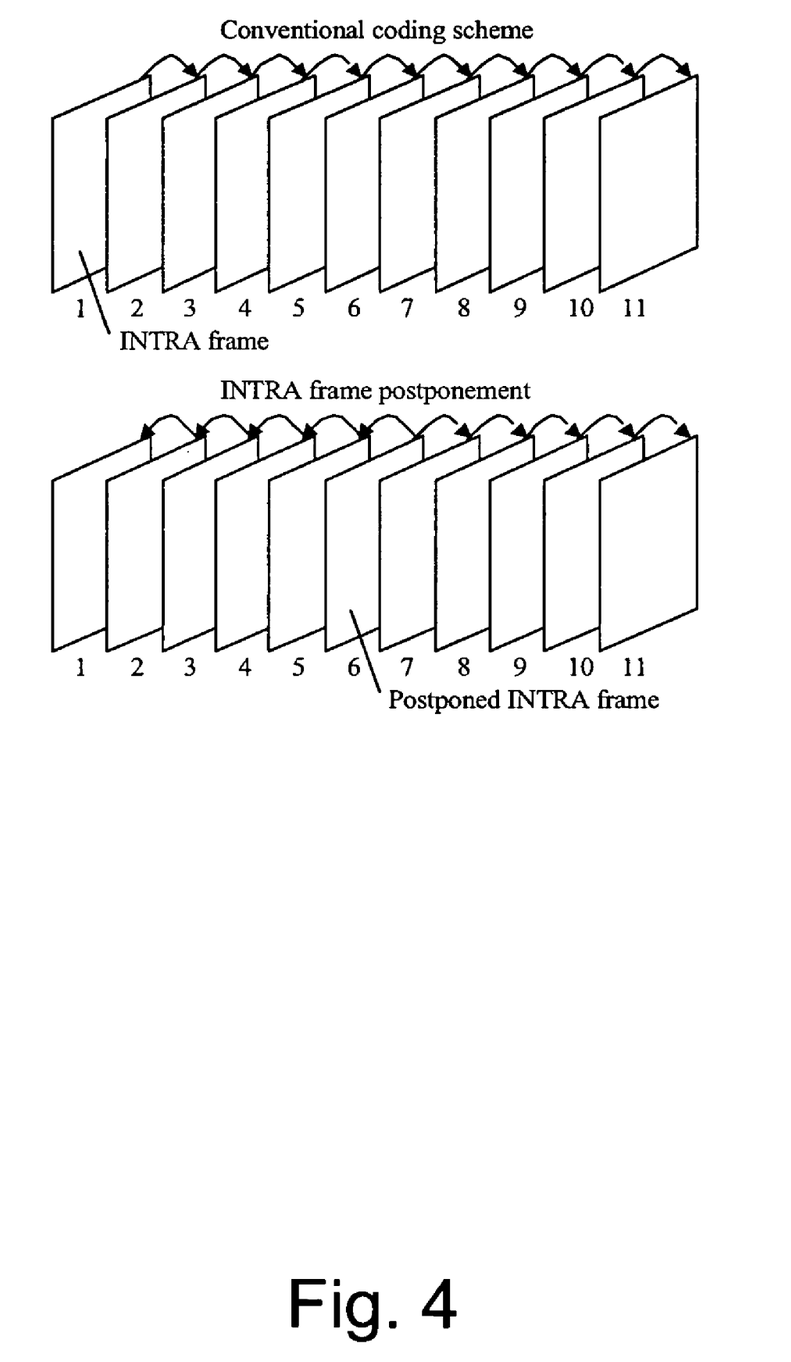
FIG. 4 presents an example of the intra picture postponement method that can be used to improve error resiliency.

FIG. 4 presents an example of the intra picture postponement method that can be used to improve error resiliency. Conventionally, an intra picture is coded immediately after a scene cut or as a response to an expired intra picture refresh period, for example. In the intra picture postponement method, an intra picture is not coded immediately after a need to code an intra picture arises, but rather a temporally subsequent picture is selected as an intra picture. Each picture between the coded intra picture and the conventional location of an intra picture is predicted from the next temporally subsequent picture. As FIG. 4 shows, the intra picture postponement method generates two independent inter picture prediction chains, whereas conventional coding algorithms produce a single inter picture chain. It is intuitively clear that the two-chain approach is more robust against erasure errors than the one-chain conventional approach. If one chain suffers from a packet loss, the other chain may still be correctly received. In conventional coding, a packet loss always causes error propagation to the rest of the inter picture prediction chain.

In the JVT coding standard, decoded pictures have to be buffered for two reasons: First, decoded pictures are used as reference pictures for predicting subsequent coded pictures. Second, due to decoupling of the decoding order from the display order, decoded pictures have to be reordered in display order.

The following example is used to explain the problem of separate buffering the present invention overcomes.

Consider the following sequence of pictures, where P is a predicted picture, BS a reference bi-predictive picture, and BN a non-reference bi-predictive picture, and the number relates to display order:

| Display order | P1 | BN2 | BN3 | BS4 | BN5 | BN6 | P7 | ... |
|---|---|---|---|---|---|---|---|---|
| Decoding order | P1 | P7 | BS4 | BN2 | BN3 | BN5 | BN6 | |

This can be decoded with three picture memories in the reference picture buffer, but when BN5 is decoded, it is not yet time to display it:

| Decoded time | P1 | P7 | BS4 | BN2 | BN3 | BN5 | BN6 | | | |
|---|---|---|---|---|---|---|---|---|---|---|
| Display time | | | | P1 | BN2 | BN3 | BS4 | BN5 | BN6 | P7 ... |

Therefore BN5 has to be stored to reorder pictures in display order.

The problem does not exist in conventional video coding standards, because the display order for all reference pictures is the same as their decoding order and because only the latest decoded reference picture has to be buffered to reorder pictures in display order if B pictures are in use. The conventional video coding standard supporting reference picture selection have a reference picture buffer but they do not have a picture buffer for display reordering.

The following straightforward proposal was proposed for the JVT coding standard: Have a picture buffer for reference pictures that is separate from a picture buffer for display reordering. Specify the maximum number of pictures separately for both buffers.

Let us reconsider the above described example again. A reference picture enters the reference picture buffer as soon as it is decoded. A non-reference picture does not enter the reference picture buffer. A decoded picture is removed from the reference picture buffer as soon as it is no longer needed for reference. For example, picture P1 can be removed after decoding of picture BN3. A picture enters the display reordering buffer as soon as it is decoded. A decoded picture is removed from the display reordering buffer when it can be displayed. The figure below shows the contents of the buffers just after decoding each picture.

| Decoded time | P1 | P7 | BS4 | BN2 | BN3 | BN5 | BN6 | | |
|---|---|---|---|---|---|---|---|---|---|
| Display time | | | | P1 | BN2 | BN3 | BS4 | BN5 | BN6 P7 |
| Reference buf | P1 | P1 P7 | P1 P7 | P1 BS4 P7 | BS4 P7 | BS4 P7 | P7 | | |
| Display buf | | P1 | P1 P7 | BS4 P7 | BS4 P7 | BS4 BN5 P7 | BN6 P7 | P7 | |

It can be seen that the required sizes of the reference picture buffer and the display reordering buffer are 3 pictures and 2 pictures respectively.

SUMMARY OF THE INVENTION

In the present invention the reference picture buffer and the display picture buffer are combined, wherein both the reference pictures and the pictures to be reordered are stored in the same buffer to avoid the need to store the same picture in two different places.

The present invention provides a hypothetical decoder, signal, encoder, decoder, method, device, system and computer program for use in any kind of network device and terminal device, wherein the same buffer can be used to store at the decoder both the reference pictures and the pictures waiting to be displayed. Furthermore, the pictures are not stored twice in the memory.

In one embodiment of the present invention the usability of the unified buffering is further increased by defining an attribute for the number of pictures waiting for reordering in the buffer. The attribute num_reorder_frames is the number of consecutive frames in decoding order that is required to recover the output order of pictures at any time. The sum of the maximum number of reference frames stored in the unified buffer and the maximum number of the pictures to be reordered for displaying, excluding those pictures which already are stored as reference pictures, is set smaller than or equal to the current capacity of the unified buffer. This means that the buffer can not overflow, therefore it is not necessary to test it. Instead, an optional Hypothetical Reference Decoder (HRD) can check that no picture is removed from the buffer before its output time stamp.

According to one aspect of the present invention there is provided a hypothetical decoder for hypothetically decoding an encoded picture stream, the pictures being defined as reference pictures or non-reference pictures, and information relating to decoding order and output order of a picture is defined for pictures of the picture stream. The hypothetical decoder is primarily characterized in that the hypothetical decoder comprises a unified picture buffer for buffering reference pictures and pictures to be reordered, and that the hypothetical decoder comprises the following:

a processing block for performing the following before inserting a newly decoded picture to the buffer,     examining if the newly decoded picture can be inserted in the buffer without removing another picture from the buffer,     on the basis of said examination, if the newly decoded picture cannot be inserted in the buffer without removing another picture from the buffer, selecting a picture to be removed from those pictures in the buffer which are not used as reference pictures and which have already been output from the buffer,     if a picture was selected, removing the selected picture from the buffer, otherwise indicating an error.

According to another aspect of the present invention there is provided a signal containing an encoded picture stream, the pictures being defined as reference pictures or non-reference pictures, and information relating to decoding order and output order of a picture is defined for pictures of the picture stream. The signal is primarily characterized in that the signal contains an indication of such a number of pictures arranged to be buffered in decoding order that is sufficient to recover the output order of pictures.

According to a third aspect of the present invention there is provided an encoder for forming an encoded picture stream, the pictures being defined as reference pictures or non-reference pictures, and information relating to decoding order and output order of a picture is defined for pictures of the picture stream. The signal is primarily characterized in that the encoder is arranged to form to the bitstream an indication of such a number of pictures arranged to be buffered in decoding order that is sufficient to recover the output order of pictures.

According to a fourth aspect of the present invention there is provided an encoder comprising a hypothetical decoder for hypothetically decoding an encoded picture stream, the pictures being defined as reference pictures or non-reference pictures, and information relating to decoding order and output order of a picture is defined for pictures of the picture stream. The encoder is primarily characterized in that the encoder comprises a unified picture buffer for buffering reference pictures and pictures to be reordered, and that the hypothetical decoder comprises the following:
a processing block for performing the following before inserting a newly decoded picture to the buffer,
    examining if the newly decoded picture can be inserted in the buffer without removing another picture from the buffer,
    on the basis of said examination, if the newly decoded picture cannot be inserted in the buffer without removing another picture from the buffer, selecting a picture to be removed from those pictures in the buffer which are not used as reference pictures and which have already been output from the buffer,
    if a picture was selected, removing the selected picture from the buffer, otherwise indicating an error.

According to a fifth aspect of the present invention there is provided a method for forming an encoded picture stream comprising defining the pictures as reference pictures or non-reference pictures, and defining information relating to decoding order and output order of a picture for pictures of the picture stream. The method is primarily characterized in that an indication of such a number of pictures arranged to be buffered in decoding order that is sufficient to recover the output order of pictures is defined to the bitstream.

According to a sixth aspect of the present invention there is provided a method for buffering decoded pictures, the pictures being defined as reference pictures or non-reference pictures, the size of the buffer is defined, and the number of reference pictures in the buffer is defined. The method is primarily characterized in that a unified picture buffer is used for buffering both prediction references and decoded pictures for arranging them in displaying order.

According to a seventh aspect of the present invention there is provided a decoder including means for buffering decoded pictures, the pictures being defined as reference pictures or non-reference pictures, the size of the buffer is defined, and the number of reference pictures in the buffer is defined. The decoder is primarily characterized in that the means for buffering includes a unified picture buffer for buffering both prediction references and decoded pictures for arranging them in displaying order.

According to a eighth aspect of the present invention there is provided a software program comprising machine executable steps for forming an encoded picture stream, the pictures being defined as reference pictures or non-reference pictures, and information relating to decoding order and output order of a picture is defined for pictures of the picture stream. The software program is primarily characterized in that the software program comprises machine executable steps for arranging to form to the bitstream an indication of such a number of pictures arranged to be buffered in decoding order that is sufficient to recover the output order of pictures.

According to a ninth aspect of the present invention there is provided a software program comprising machine executable steps for hypothetically decoding an encoded picture stream, the pictures being defined as reference pictures or non-reference pictures, and information relating to decoding order and output order of a picture is defined for pictures of the picture stream. The software program is primarily characterized in that the software program comprises machine executable steps for buffering reference pictures and pictures to be reordered in a unified picture buffer, and that the software program further comprises the following:
machine executable steps for performing the following before inserting a newly decoded picture to the buffer,
    examining if the newly decoded picture can be inserted in the buffer without removing another picture from the buffer,
    on the basis of said examination, if the newly decoded picture cannot be inserted in the buffer without removing another picture from the buffer, selecting a picture to be removed from those pictures in the buffer which are not used as reference pictures and which have already been output from the buffer,
if a picture was selected, removing the selected picture from the buffer, otherwise indicating an error.

According to a tenth aspect of the present invention there is provided a storage medium for storing a software program comprising machine executable steps for forming an encoded picture stream, the pictures being defined as reference pictures or non-reference pictures, and information relating to decoding order and output order of a picture is defined for pictures of the picture stream. The storage medium is primarily characterized in that the software program comprises machine executable steps for arranging to form to the bitstream an indication of such a number of pictures arranged to be buffered in decoding order that is sufficient to recover the output order of pictures.

According to a eleventh aspect of the present invention there is provided an electronic device comprising a decoder including means for buffering decoded pictures, the pictures being defined as reference pictures or non-reference pictures, the size of the buffer is defined, and the number of reference pictures in the buffer is defined. The electronic device is primarily characterized in that the means for buffering includes a unified picture buffer for buffering both prediction references and decoded pictures for arranging them in displaying order.

According to a twelfth aspect of the present invention there is provided a system comprising an encoder for forming a signal containing an encoded picture stream, the pictures being defined as reference pictures or non-reference pictures, and information relating to decoding order and output order of a picture is defined for pictures of the picture stream, a transmission channel for transmitting the signal to a decoder, the decoder including means for buffering decoded pictures. The system is primarily characterized in that system comprising an encoder for forming a signal containing an encoded picture stream, the pictures being defined as reference pictures or non-reference pictures, and information relating to decoding order and output order of a picture is defined for pictures of the picture stream, a transmission channel for transmitting the signal to a decoder, the decoder including means for buffering decoded pictures.

The invention solves the decoded picture buffering problem in the JVT coding standard that did not exist in conventional video coding standards. The invention saves memory compared to the other solution proposed for the JVT coding standard. The advantage that the memory needed for buffer-

DETAILED DESCRIPTION OF THE INVENTION

In the unified buffer solution all decoded pictures stay in the unified buffer until they are no longer used as reference pictures and until their display order comes. The unified buffer saves memory compared to separate picture buffers for reference pictures and for reordering in display order.

Let us reconsider the previous example again when a unified buffer is in use.

| Decoded time | P1 | P7 | BS4 | BN2 | BN3 | BN5 | BN6 | | |
|---|---|---|---|---|---|---|---|---|---|
| Display time | | | P1 | BN2 | BN3 | BS4 | BN5 | BN6 | P7 |
| Unified buffer | P1 | P1 | P1 | P1 | BS4 | BS4 | BN6 | P7 | |
| | | | P7 | BS4 | BS4 | P7 | BN5 | P7 | |
| | | | | P7 | P7 | | P7 | | |

However, there are some matters which should be taken into account in the unified buffer solution. The size of the buffer should be set big enough to store all the pictures which are still needed, i.e. all reference pictures and pictures to be reordered. The memory capacity is often limited so the size of the buffer is some kind of compromise. The encoder has to check that the decoder is able to store enough pictures to decode and output all pictures without errors. This check can be performed by an optional Hypothetical Reference Decoder (HRD) in the encoding device. The HRD comprises a coded picture buffer for storing a coded data stream and a decoded picture buffer for storing decoded reference pictures and for reordering decoded pictures in display order. The HRD moves data between the buffers similarly to the way a decoder of a decoding device does. However, the HRD need not decode the coded pictures entirely nor output the decoded pictures, but the HRD only checks that the decoding of the picture stream can be performed under the constraints given in the coding standard. When the HRD is operating, it receives a coded data stream and stores it to the coded picture buffer. In addition, the HRD removes coded pictures from the coded picture buffer and stores at least some of the corresponding hypothetically decoded pictures into the decoded picture buffer. The HRD is aware of the input rate according to which the coded data flows into the coded picture buffer, the removal rate of the pictures from the coded picture buffer, and the output rate of the pictures from the decoded picture buffer. The HRD checks for coded or decoded picture buffer overflows, and it indicates if the decoding is not possible with the current settings. Then the HRD informs the encoder about the buffering violation wherein the encoder can change the encoding parameters by, for example, reducing the number of reference frames, to avoid buffering violation. Alternatively or additionally, the encoder starts to encode the pictures with the new parameters and sends the encoded pictures to the HRD which again performs the decoding of the pictures and the necessary checks. As a yet another alternative, the encoder may discard the latest encoded frame and encode later frames so that no buffering violation happens.

Slice-Based Operation

The minimum recommended unit to encapsulate in a transmission packet is a slice or a data partition. The minimum relatively independently decodable unit is a slice. Consequently, the unified buffering model assumes that a whole slice or a whole data partition is transmitted at a time. The model also assumes that packet-based networks and transmission protocols are used, and therefore a whole slice or a whole data partition is received at a time.

It is assumed that one slice is being decoded at a time. Thus, data is removed from the hypothetical input buffer slice by slice. The proposed complexity model is used to determine the time needed to virtually decode a slice. When that time is expired, the next slice can be virtually decoded.

Overview of the Buffering Model of the Present Invention

The reference decoder is based on a buffer model presented in this section. The model is based on three buffers: the pre-decoder buffer, the decoding buffer, and the post decoder buffer. The pre-decoder buffer buffers compressed data. The operation of the decoding buffer represents the operation of a real decoder and sets the processing complexity constraints. The post-decoder buffer contains reconstructed pictures that are used for reference picture for motion compensation and/ or wait for a correct moment to be virtually displayed.

The default buffer sizes are given in the profile and level definitions. The buffer sizes can also be negotiated. The size of the decoding buffer gives the maximum size of a slice. The size of the post-decoder buffer can be given in bytes or in units of 16×16 pixels, for example.

The operation of the pre- and post-decoder buffer can be controlled by two parameters. The initial pre-decoder buffering period and the initial post-decoder buffering period define how long the buffers are filled in before any data is removed from them. The periods are signalled for each bit-stream separately.

Three time-stamps can be associated for a data unit (a data partition, a slice, or a picture). Each slice and data partition is associated with a transmission time. In case of file access, the transmission time is indicated in the file. Otherwise, the real transmission time is used. Each slice can be associated with a decoding time. The decoding time can be used to delay decoding of a slice in order to avoid overflows of the post-decoder buffer. Each picture is associated with a display time.

Time-related parameters are given in a common time-scale such as clock ticks of a 90 kHz or a 27 MHz clock.

The model can be applied to any continuous and independently decidable part of a coded bit-stream. In case of discontinuities, such as accessing a bit-stream from a random position, the model is reset.

Operation of the Buffering Model

The model is defined as follows:
1. The buffers are initially empty.
2. A slice or a data partition, excluding its real header, is added to the pre-decoder buffer at its transmission time. A certain amount of memory, for example eight bytes, of additional memory is reserved for each slice to store its header. (Actual slice headers may be closely linked with some payload header specific data, such as the parameter set indicator in the draft RTP payload format (VCEG-N72R1). It is impractical to remove this kind of data from header portion of the slice for HRD purposes only. Thus, a constant size of the slice header is assumed.)

3. No data is removed from the pre-decoder buffer during a period called the initial pre-decoder buffering period. The period starts when the first slice or data partition is added to the buffer.

4. When the initial pre-decoder buffering period has expired and if decoding time-stamps are in use, the decoding timer is started from the decoding time of the earliest picture in the picture buffer. Otherwise, no decoding timer is needed.

5. Pictures are removed from the pre-decoder buffer slice by slice in ascending order of picture identifiers (using modulo arithmetic). Slices of a particular picture are removed in their transmission order. A slice, including its data partitions, is moved from the pre-decoder buffer to the decoding buffer at one time when the decoding buffer becomes empty. However, a slice is not removed from the pre-decoder buffer before the decoding timer reaches the decoding time of the slice.

6. A slice remains in the decoding buffer as long as its calculated decoding duration. The duration is the larger one of the two candidates: candidate 1=number of macroblocks in a slice/maxMacroblockPerSec and candidate 2=number of bits in a slice/maxBitsPerSec.

7. An uncompressed picture enters the post-decoder buffer when the last slice (in the decoding order) of the corresponding coded picture is removed from the decoding buffer.

8. Data is not removed from the post-decoder buffer during a period called the initial post-decoder buffering period. The period starts when the first picture has been placed into the post-decoder buffer.

9. When the initial post-decoder buffering period has expired, the playback timer is started from the earliest display time of the pictures residing in the post-decoder buffer at that time.

10. A picture is virtually displayed when the playback timer reaches the scheduled display time of the picture.

11. A picture is removed from the post-decoder buffer when it is virtually displayed and when it is no longer needed as a reference picture.

Requirements for a Compliant Bit-Stream

Any transmitted or stored bit-stream shall comply with the following requirements:

The occupancy of the pre-decoder buffer shall not exceed the default or signalled buffer size.

Any slice shall not be larger than the size of the decoding buffer.

The occupancy of the post-decoder buffer shall not exceed the default or signalled buffer size.

Each picture shall be inserted into the post-decoder buffer before or on its display time.

When the default buffer sizes according to a certain profile and level are used, a bit-stream is compliant with this profile and level.

Requirements for a Compliant Decoder

A decoder shall be capable of receiving and decoding all the pictures in a compliant bit-stream when the same buffer sizes are assumed both in the decoder and in the bit-stream. Furthermore, the decoder shall pass each picture to a display process at the same time when the hypothetical reference decoder would display the picture virtually.

Figure 5:
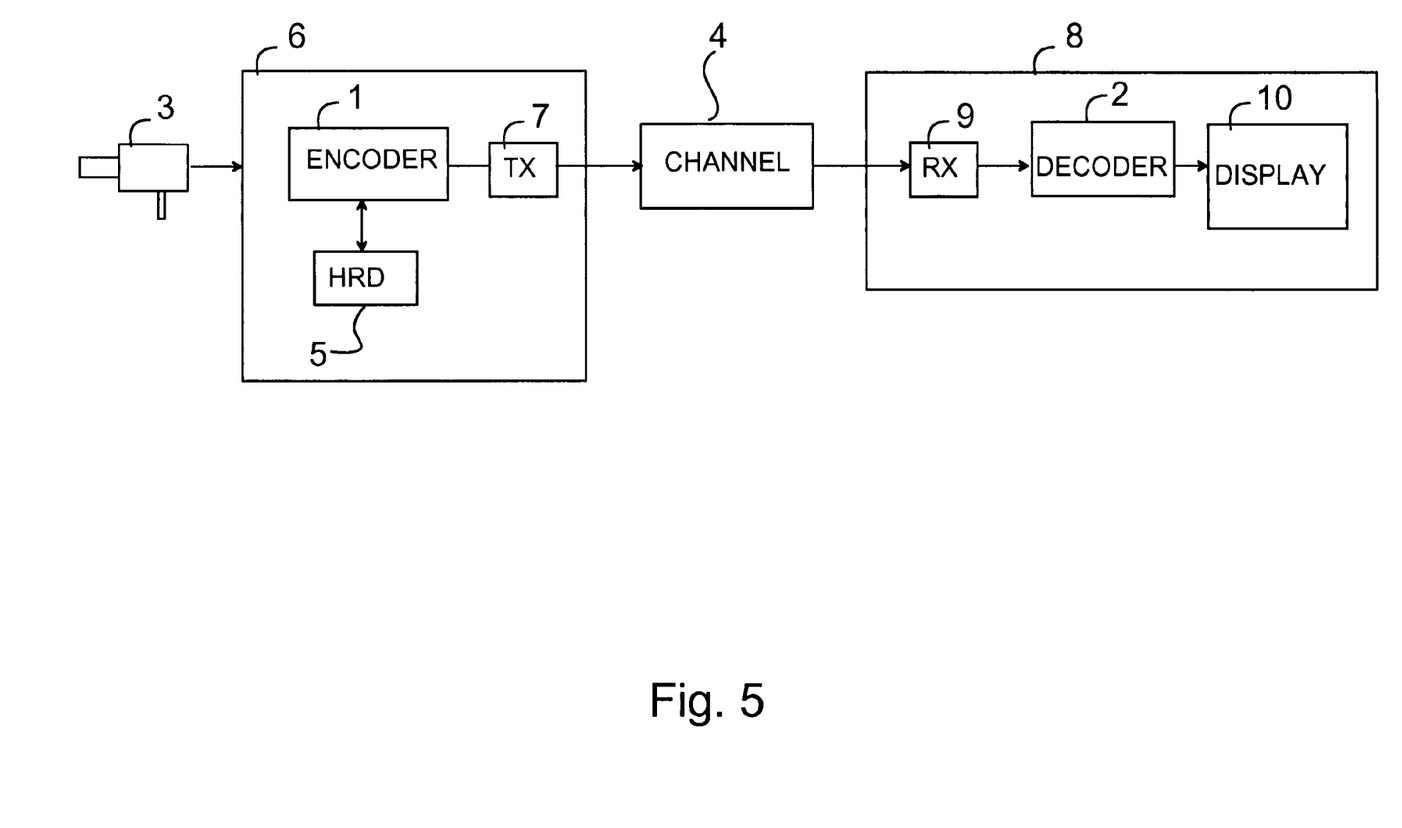
FIG. 5 depicts an advantageous embodiment of the system according to the present invention.
Figure 6:
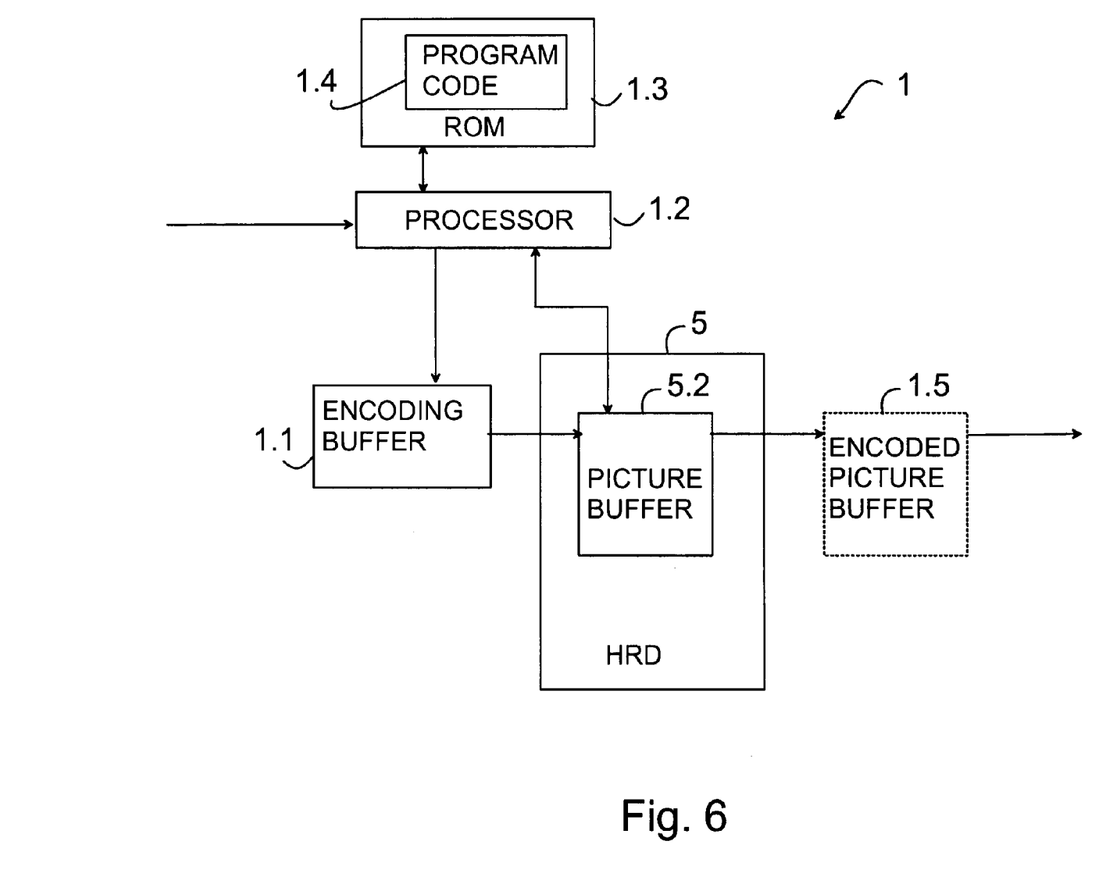
FIG. 6 depicts an advantageous embodiment of the encoder according to the present invention.
Figure 7:
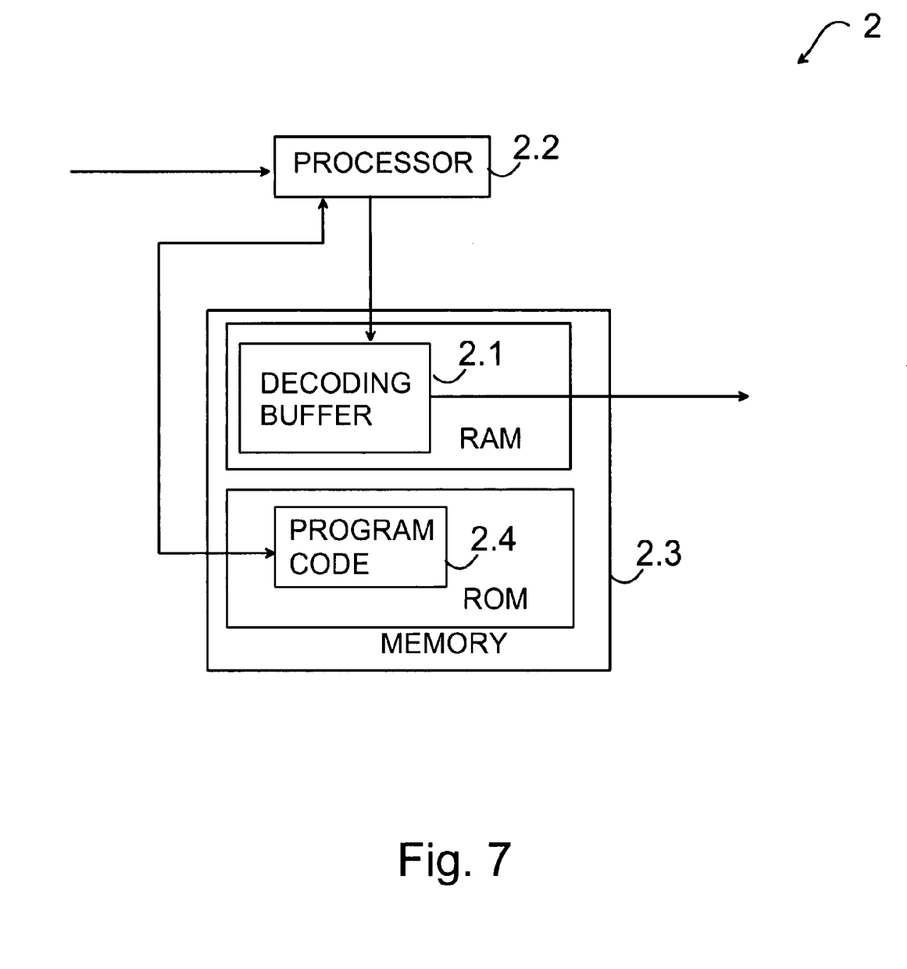
FIG. 7 depicts an advantageous embodiment of the decoder according to the present invention.

In the following the invention will be described in more detail with reference to the system of FIG. 5, the encoder 1 and hypothetical reference decoder (HRD) 5 of FIG. 6 and decoder 2 of FIG. 7. The pictures to be encoded can be, for example, pictures of a video stream from a video source 3, e.g. a camera, a video recorder, etc. The pictures (frames) of the video stream can be divided into smaller portions such as slices. The slices can further be divided into blocks. In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 6) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6. The encoder 1 performs motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In JVT the display order and the decoding order of the pictures are not necessarily the same, wherein the reference picture has to be stored in a buffer (e.g. in the encoding buffer 1.1) as long as it is used as a reference picture. The encoder 1 also inserts information on display order of the pictures into the transmission stream.

From the encoding process the encoded pictures are moved to an optional encoded picture buffer 1.5, if necessary. The encoded pictures are transmitted from the encoder 1 to the decoder 2 via the transmission channel 4. In the decoder 2 the encoded pictures are decoded to form uncompressed pictures corresponding as much as possible to the encoded pictures. Each decoded picture is buffered in the DPB 2.1 of the decoder 2 unless it is displayed substantially immediately after the decoding and is not used as a reference picture. In the system according to the present invention both the reference picture buffering and the display picture buffering are combined and they use the same decoded picture buffer 2.1. This eliminates the need for storing the same pictures in two different places thus reducing the memory requirements of the decoder 2.

The decoder 1 also includes a memory 2.3 and a processor 2.2 in which the decoding tasks according to the invention can be applied. The memory 2.3 and the processor 2.2 can be common with the receiving device 8 or the receiving device 8 can have another processor and/or memory (not shown) for other functions of the receiving device 8.

Let us now consider the encoding-decoding process in more detail. Pictures from the video source 3 are entered to the encoder 1 and advantageously stored in the encoding buffer 1.1. The encoding process is not necessarily started immediately after the first picture is entered to the encoder, but after a certain amount of pictures are available in the encoding buffer 1.1. Then the encoder 1 tries to find suitable candidates from the pictures to be used as the reference frames. The encoder 1 then performs the encoding to form encoded pictures. The encoded pictures can, for example, be predicted pictures (P), bi-predictive pictures (B), or intra-coded pictures (I). The intra-coded pictures can be decoded without using any other pictures, but other type of pictures need at least one reference picture before they can be decoded. Pictures of any of the above mentioned picture types can be used as a reference picture.

The encoder attaches two time stamps to the pictures: a decoding time stamp (DTS) and output time stamp (OTS). The decoder can use the time stamps to determine the correct decoding time and time to output (display) the pictures. However, those time stamps are not necessarily transmitted to the decoder or it does not use them.

If the encoder has the HRD 5, the encoder defines the size of the DPB 5.2 (DPB size). The initial size may depend on some parameters relating to the video stream (e.g. resolution, colour/BW, etc.). There can also be a maximum size defined for the DPB 5.2 (DPBcapacity). The initial size may not necessarily be the same as the maximum size but it can also be smaller than the maximum size. Also the maximum number of reference frames stored in the DPB is defined. This value is referred as num_ref_frames in this description.

In the decoder the DPB 2.1 has a limited size (DPB size) which in some applications may be varied during the decoding process, if necessary. The initial size of the DPB 2.1 may depend on some parameters relating to the video stream (e.g. resolution, colour/BW, etc.). There can also be a maximum size defined for the DPB 2.1 (DPBcapacity). The initial size may not necessarily be the same as the maximum size but it can also be smaller than the maximum size. Also the maximum number of reference frames stored in the DPB is defined. This value is referred as num_ref_frames in this description.

The transmission and/or storing of the encoded pictures (and the optional virtual decoding) can be started immediately after the first encoded picture is ready. This picture is not necessarily the first one in decoder output order because the decoding order and the output order may not be the same. However, because the size of the DPB 2.1 of the decoder 2 is limited it is necessary to define how long the delay between decoding time of a picture and the display time of the picture can be at maximum, i.e. the maximum number of the pictures to be reordered for displaying. This value is referred as num_reorder_frames in this description. num_reorder_frames is the number of consecutive frames in decoding order that is required to recover the output order of pictures at any time. The sum of the maximum number of reference frames stored in the DPB and the maximum number of the pictures to be reordered for displaying, excluding those pictures which already are stored as reference pictures, must not be greater than the current capacity of the DPB. DPB size illustrates how many pictures can be stored in the DPB 2.1. It can be calculated by dividing the size of the DPB (in bytes) by the size of a picture (in bytes).

When the first picture of the video stream is encoded the transmission can be started. The encoded pictures are optionally stored to the encoded picture buffer 1.5. The transmission can also start at a later stage, for example, after a certain part of the video stream is encoded.

The decoder 2, 5 should output the decoded pictures in correct order, for example by using the ordering of the picture order counts, and hence the reordering process need be defined clearly and normatively.

Next, the operation of the decoder 2 according to an embodiment of the present invention will be described. The DPB 2.1 contains memory places for storing a number of pictures. Those places are also called as frame stores in this description. An attribute FrameStoreUsage is used here as the indicator of the reservation status of a frame store (in use/not in use). The value of FrameStoreUsage reflects the usage of current frame store. A first value (e.g. 0) means the frame store is empty and it can be overwritten safely. A second value (e.g. 1) means this is a frame store used for reference (but not for reordering), a third value (e.g. 2) means this is a frame store used for reordering (but not for reference). A fourth value (e.g. 3) means this is a frame store used for both reference and reordering. The initial value of FrameStoreUsage shall be the first value. It is also possible to use a separate, second attribute to define whether a picture is (virtually) displayed or not. It can have values "unused for output" or "used for output". A picture marked as "used for output" means the picture still stays in the DPB and waits for its turn to output. It shall be marked as "unused for output" as a result of outputting the picture. If the second attribute is used, only the first and second values would be used with the FrameStoreUsage, wherein the combination of the first and the second attribute gives the same information as the FrameStoreUsage with the four different value alternatives. It is also possible to define an attribute for the validity of a picture (valid/invalid). A picture is marked as "Invalid" if it is intentionally inserted in order to fill the detected gaps between neighbouring frame_num. Otherwise, the picture is marked as "Valid", which may be correctly decoded or reconstructed by means of error concealments. The frame stores can also be uniquely indexed which implies the decoding order of the buffered pictures.

In the beginning of the decoding procedure the status of all the frame stores is set to empty, or free. This is done by setting the FrameStoreUsage to the first value for all frame stores. The decoder 2 can also set the following variables to an initial value (e.g. 0): num_frames_in_use, which contains the number of frame stores used for either reference or output; num_frames_use_ref, which contains the number of frame stores used for reference; and num_frames_use_output, which contains the number of frame stores used for output.

An additional frame store is used to save the newly decoded picture. The DPB plus the additional frame store is called the Extended DPB (EDPB).

Step 1: Decoding

Figure 8:
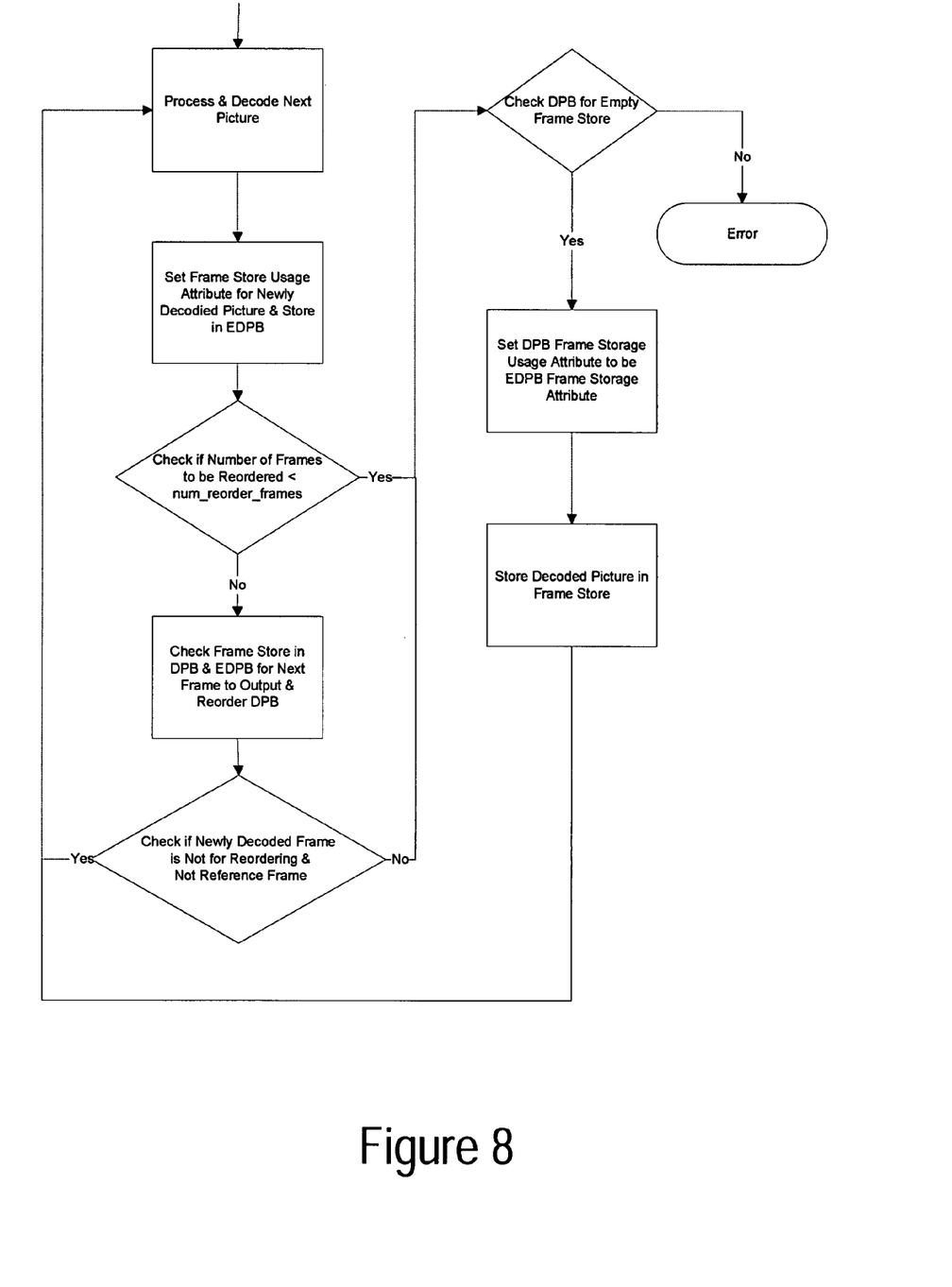
FIG. 8 depicts a process by which a decoded picture is inserted into a unified picture buffer in an exemplar embodiment of the present invention.

The decoder 2 starts to decode the encoded pictures beginning from the picture having smallest decoding time stamp. When the picture is decoded it will be stored to the additional frame store. The picture to be decoded can either be a frame or a field. If it is a reference picture, the FrameStoreUsage is set to the fourth value, otherwise to the third value. It is labelled as "used for reordering" at first, because it cannot be determined whether the newly decoded picture needs reordering or not at this step without the information about the DPB.

Step 2: Reordering

Before the following steps, the decoder 2 needs to know if there is at least one more picture to be decoded and some information from the slice header of the next picture to be decoded.

Step 2.1 If there is at least one more picture to be decoded and the number of frames to be reordered in DPB is less than num_reorder_frames, the decoder 2 does not output a picture. If the newly decoded picture is used for reference, then Step 3 will be executed, otherwise Step 4 will be executed.

Step 2.2 If there is at least one more picture to be decoded and the number of frames to be reordered in DPB is equal to num_reorder_frames, the following conditions will be checked:

The newly decoded picture is a frame.
The additional frame store contains two fields.
If a single field resides in the additional frame store, the next picture to be decoded is not its opposite parity of the same frame.

If none of the above conditions is true, go to Step 1 to decode the opposite parity field of the same frame.

Then, if at least one of the above conditions is true, the frame stores in DPB and the additional frame store will be looked through to find which picture needs to be output. The picture, which is the first picture in the output order among the pictures to be reordered in DPB and the additional frame store, shall be output. How to determine the first picture in the output order is described later. If the outputted picture is a field and the opposite parity field of the same frame is present, both fields are output. The output pictures should be marked as "unused for reordering".

If the newly decoded picture is output and is not used for reference, then go to Step 1 to decode the next picture. If the newly decoded picture is used for reference (but not used for reordering), FrameStoreUsage is set to the second value (1) and the Step 3 follows. If the newly decoded picture is used for reordering (but not used for reference), FrameStoreUsage is set to a third value (2) and then go to Step 4 to store the picture for reordering. If the newly decoded picture is used both for reference and reordering, set FrameStoreUsage to the fourth value (3) and then go to Step 3.

Step 2.3 If there are no more pictures to be decoded, all the pictures that are still marked as "used for reordering" shall be output in output order. Then the decoder stops working until there are more pictures to decode.

Step 3: Marking Picture as "Unused for Reference"

If the newly decoded picture is a reference picture, "Sliding Window" or "Adaptive Memory Control" mechanism is applied to the frame store set consisting of pictures marked as "used for reference".

Step 4: Storing

If the newly decoded picture is a frame, the step 4.1 will be performed, otherwise the step 4.2.

Step 4.1 There should be at least one empty frame store in the DPB 2.1 before storing the newly decoded frame. FrameStoreUsage is set to be equal to FrameStoreUsage of the additional frame store. Go to Step 1 to decode the next picture.

Step 4.2 For a newly decoded field, the destination frame store will be an empty frame store if its opposite parity field of the same frame is not in the DPB 2.1. In this case the FrameStoreUsage is set to be equal to FrameStoreUsage of the additional frame store. Otherwise, the newly decoded picture should be stored into the same frame store as its opposite parity field and FrameStoreUsage is unchanged. Go to Step 4.3 to decode the next picture.

Step 4.3 After storing the newly decoded picture into the DPB, it is assumed that the latest decoded picture is stored in a frame whose FrameStoreIndex is 0, the second latest decoded picture is stored in a frame store whose FrameStoreIndex is 1, and so on. Last, Step 1 is performed to decode the next picture.

It should be noticed that marking a picture as "unused for reference" and marking a picture as "unused for reordering" are decoupled.

To help understand the operations in the steps presented above, two examples are shown for the reordering process. The italic numbers after (or below) the picture labels indicate the frame_num. Reference pictures are indicated by underlining the letter of the picture label. 'x' means no picture is reordered before decoding the next picture.

Example 1 num reorder frames=1; 10 frames are coded.

| Coded pictures in output order | I0 | B1 | B2 | P3 | B4 | B5 | P6 | B7 | B8 | P9 |
|---|---|---|---|---|---|---|---|---|---|---|
| Decoding order: | I0 0 | P3 1 | B1 2 | B2 2 | P6 2 | B4 3 | B5 3 | P9 3 | B7 4 | B8 4 |
| After reordering | x | I0 | B1 | B2 | P3 | B4 | B5 | P6 | B7 | B8, P9 |

Example 2 num reorder frames=2; 13 frames are coded.

| Coded pictures in output order | I0 | B1 | B2 | B3 | P4 | B5 | B6 | B7 | P8 | B9 | B10 | B11 | P12 |
|---|---|---|---|---|---|---|---|---|---|---|---|---|---|
| Decoding order | I0 0 | P4 1 | B2 2 | B1 3 | B3 3 | P8 3 | B6 4 | B5 5 | B7 5 | P12 5 | B10 6 | B9 7 | B11 7 |
| After reordering | X | x | I0 | B1 | B2 | B3 | P4 | B5 | B6 | B7 | P8 | B9 | B10, B11, P12 |

If the decoder 2 notices that the encoded pictures can not be decoded, the size of the DPB 2.1 may be too small. In some applications the decoder 2 can inform the encoder to change the encoding parameters, for example, to use less reference pictures, or to use larger DPB size. In the error situation the decoder 2 may still output those decoded pictures which it managed to decode and/or to output some default pictures (e.g. empty frames).

Sliding Window Operation for Reordering

The num_reorder_frames is used to define the sliding window operation for reordering purpose. The pictures to be reordered are arranged in output order to find out the picture which should jump out of the scope of the window first. Once the number of pictures to be reordered reaches the num_reorder_frames, the first picture in output order is sure to fall out of the window as the result of one sliding window operation. This subsection specifies how to find the earliest picture in output order among the pictures that are marked as "used for reordering".

Step 1. Initialization. Set the oldest picture in decoding order in DPB1 be the candidate picture.

Step 2. Loop from the second oldest picture to the latest picture (in decoding order) and use i as the loop counter. The loop body is composed by Step 2.1 and Step 2.2.

Step 2.1 If picture i is an IDR picture, the candidate picture is the picture to find, break the loop.

Step 2.2 If the POC of picture i is less than the POC of the candidate picture, set picture i as the candidate picture.

Step 3. End. The candidate picture is the oldest picture in output order.

The num_ref_frames and num_reorder_frames are signalled to the decoder 2 by some way, for example by a sequence parameter set. Every time when a different sequence parameter set becomes effective, num_ref_frames or num_reorder_frames may change and thus special care on the DPB should be taken.

1.5.1 Changing of num_ref_frames

No special actions need to be done when num_ref_frames increases.

When num_ref_frames decreases, a simple operation upon the DPB is proposed: Let diff_ref_frames equal to the new num_ref_frames minus old num_ref_frames. All the diff_ref_frames reference frames from the oldest in decoding order shall be marked as "unused for reference".

1.5.2 Changing of num_reorder_frames

When num_reorder_frames increases, 0 picture per one decoded picture is output in (new num_reorder_frames)–(old num_reorder_frames) pictures after (old num_reorder_frames) picture since the decoded picture using the new sequence parameter set. For example, the num_reorder_frames of two parts of the bitstream are 1 and 2 respectively. When P3 is decoded, no picture is output.

| Decoding order | I0 | P2 | B1 | P4 | B3 | I0 | | P3 | B2 | B1 | P6 | B5 | B4 |
|---|---|---|---|---|---|---|---|---|---|---|---|---|---|
| After reordering | x | I0 | B1 | P2 | B3 | P4 | | x | I0 | B1 | B2 | P3 | B4, B5, B6 |

When num_reorder_frames decreases, more than one picture is output at the decoded picture using the new sequence parameter set. For example, the num_reorder_frames of two parts of the bitstream are 2 and 1 respectively. When I0 is decoded, two pictures B5 and P6 are output at the same time.

| Decoding order | I0 | P3 | B2 | B1 | P6 | B5 | B4 | I0 | | P2 | B1 | P4 | B3 |
|---|---|---|---|---|---|---|---|---|---|---|---|---|---|
| After reordering | X | x | I0 | B1 | B2 | P3 | B4 | B5, P6 | | I0 | B1 | P2 | B3, P4 |

A picture that is stored for prediction, referred to as a reference picture, is marked as "used for reference", and is labelled as a short-term reference picture, in which case it is identified by its frame_number and parity. A short-term picture may be assigned a long-term reference frame index, in which case it is identified by its long-term index. A picture that is not stored for prediction is labelled as "unused for prediction". Reference picture buffer is a picture set that are composed by pictures marked as "used for reference" in DPB. Removing a picture from reference picture buffer means marking the picture as "unused for reference". To reset the reference picture buffer means to mark all the pictures in reference picture buffer as "unused for reference". Short-term reference pictures can remain marked for reference for a finite duration, given by MaxFrameNum. Long term reference pictures can remain marked "used for reference" until the next IDR picture. Memory_management_control_operation commands can be used to modify the contents of the reference picture buffer.

In another embodiment of the present invention the HRD 5 is used with the encoder 1 to virtually perform the decoding of the encoded pictures in a way similar to that which the decoder 2 does. The encoded picture buffer 1.5 can be used as a pre-decoding buffer for a HRD 5. One aim of the virtual decoding in the HRD 5 is to eliminate a risk for decoding errors due to unbalanced encoding/decoding tasks. The HRD 5 includes a decoded picture buffer 5.2 (DPB) for temporarily storing pictures decoded by the HRD 5. Also in the HRD 5 both the reference picture buffering and the display picture buffering are combined and they use the same decoded picture buffer 5.2 thus reducing the memory requirements of the encoder 1. All decoded pictures stay in the unified buffer until they are no longer used as reference pictures and until their (virtual) display time is reached. The term virtual refers to the fact that in the HRD 5 of the encoder 1, in which the decoding is performed in this advantageous embodiment, the decoded pictures are not displayed but the HRD 5 only checks if there could be errors in the decoding process of the decoder 2 due to, for example, too small buffer size. If errors exist the HRD 5 can inform the encoder to change some encoding parameters, or the size of the DPB 2.1 of the decoder 1 can be increased, for example, by sending a SEI (Supplemental Enhancement Information) message to the decoder 1 in some implementations (unless the maximum size of the DPB is already in use).

The decoding can be a simultaneous operation with encoding, or the encoder first creates the bitstream, and when the bitstream is ready, it will be input to HRD 5 for checking that the bitstream fulfils the HRD 5 and processing level requirements. The HRD may also create and modify some HRD parameters, such as the initial buffering delay in coded picture buffer, according to the characteristics of the coded stream.

To fulfil the purpose above, the reordering process should not depend upon any HRD-related timing information, because such information may be absent in the decoder. At the same time, it should be allowed that the decoder doesn' obey HRD DTS and OTS accurately. For example, an application like a streaming recorder would like to receive bit streams, decode them and store the decoded sequence as fast as possible or operates slower due to the transmission channel capacity. In this case, the HRD DTS and OTS can not be obeyed.

The present invention can be applied in many kind of systems and devices. The transmitting device 6 including the encoder 1 and optionally the HRD 5 advantageously include also a transmitter 7 to transmit the encoded pictures to the transmission channel 4. The receiving device 8 include the decoder 2, a receiver 9 to receive the encoded pictures, and a display 10 on which the decoded pictures can be displayed. The transmission channel can be, for example, a landline communication channel and/or a wireless communication channel. The transmitting device and the receiving device include also one or more processors 1.2, 2.2 which can perform the necessary steps for controlling the encoding/decoding process of video stream according to the invention. Therefore, the method according to the present invention can mainly be implemented as machine executable steps of the processors. The buffering of the pictures can be implemented in the memory 1.3, 2.3 of the devices. The program code 1.4 of the encoder can be stored into a computer-readable medium such as the memory 1.3. Respectively, the program code 2.4 of the decoder can be stored into a computer-readable medium such as the memory 2.3.

The invention claimed is:

1. A hypothetical decoder, comprising:
at least one processor; and
at least one memory, said at least one memory stored with code thereon, which when executed by said at least one processor, causes the hypothetical decoder to
define a unified picture buffer of variable size, buffer decoded pictures that are referenced by one or more un-decoded pictures and decoded non-reference pictures into said unified picture buffer;

recorder said decoded reference pictures and decoded non-reference pictures in said unified picture buffer to an output order;

determine a parameter indicative of a number of decoded pictures arranged to be buffered in the unified picture buffer that is sufficient to recover the output order of pictures in the unified picture buffer when decoded pictures are input to buffering in decoding order;

before insertion of a newly decoded picture to the unified picture buffer, examine if the newly decoded picture can be inserted in the unified picture buffer without removing another picture from the buffer, select a decoded picture in the unified picture buffer which is not used as a reference picture and which has already been output from the unified picture buffer, if, based on said examination, the newly decoded picture cannot be inserted in the unified picture buffer without removing another decoded picture from the unified picture buffer, and if such a picture was selected, remove the picture from the unified picture buffer.

2. A hypothetical decoder according to claim 1, the decoder comprising a first attribute indicative of a number of reference pictures in the buffer, and also comprising a second attribute indicative of a number of pictures arranged to be buffered in decoding order that is sufficient to recover the output order of pictures in the buffer.

3. An encoder, comprising:

at least one processor; and at least one memory including computer program code, the at least one memory and the computer program code configured to, with the at least one processor, cause the encoder at least to:

buffer decoded pictures that are referenced by one or more un-decoded pictures and decoded non-reference pictures to be reordered in a unified picture buffer of variable size;

hypothetically decode an encoded picture stream of encoded pictures, pictures being defined as reference pictures or non-reference pictures, the pictures having a type, wherein pictures of any type may be defined as reference pictures, and information relating to decoding order and output order of a decoded picture is defined for decoded pictures of the picture stream; and form a picture stream indicator for the encoded picture stream indicative of such a number of decoded pictures arranged to be buffered in decoding order in a unified picture buffer of a decoder that is sufficient to recover the output order of pictures when decoded reference pictures and decoded non-reference pictures to be reordered are stored in a same buffer of a decoder.

4. The encoder according to claim 3, wherein the at least one memory and the computer program code configured to, with the processor, cause the encoder to define pictures as reference pictures or non-reference pictures, and also define information relating to picture decoding order and output order for pictures of the picture stream, the at least one memory and the computer program code configured to, with the processor, cause the encoder to perform at least the following actions before inserting a newly decoded picture to the buffer:

examine if the newly decoded picture can be buffered without removing another picture from the unified picture buffer, based on said examination, if the newly decoded picture cannot be inserted in the unified buffer without removing another picture from the unified picture buffer, select a picture to be removed from those pictures in the unified picture buffer which are not used as reference pictures and which have already been output from the unified picture buffer, and if a picture was selected, remove the selected picture from the unified picture buffer.

5. The encoder according to claim 3, wherein the at least one memory and the computer program code are configured to, with the processor, cause the encoder to not remove undisplayed pictures.

6. The encoder according to claim 3, wherein the at least one memory and the computer program code are configured to, with the at least one processor, cause the encoder to define a buffer size and also define a number of pictures to be used as reference pictures.

7. The encoder according to claim 6, wherein at any particular moment said number of pictures arranged to be buffered in decoding order that is sufficient to recover the output order of pictures is defined so that a sum of the number of pictures used as reference pictures and a number of pictures to be buffered in decoding order which are not used as reference pictures is less than or equal to the size of the buffer.

8. The encoder according to claim 3, the pictures being defined as reference pictures or non-reference pictures, a size of a buffer is defined, a number of reference pictures in the buffer is defined, and a number of pictures arranged to be buffered in decoding order that is sufficient to recover the output order of pictures in the buffer is defined, wherein the number of pictures to be reordered is defined so that a sum of the number of reference pictures and the number of pictures arranged to be buffered in decoding order which are not used as reference pictures is less than or equal to the size of the buffer.

9. The encoder according to claim 3, the pictures being defined as reference pictures or non-reference pictures, a size of the buffer is defined, a number of reference pictures in the buffer is defined, and a number of pictures arranged to be buffered in decoding order that is sufficient to recover the output order of pictures is defined, wherein the size of the buffer is defined so that a sum of the number of reference pictures and the number of pictures arranged to be buffered in decoding order that is sufficient to recover the output order of pictures which are not used as reference pictures is less than or equal to the size of the buffer.

10. An encoder, comprising:

at least one processor; and at least one memory including computer program code, the at least one memory and the computer program code configured to, with the at least one processor, cause the encoder to buffer decoded pictures that are referenced by one or more un-decoded pictures and decoded non-reference pictures to be reordered in a unified picture buffer of variable size; and hypothetically decode an encoded picture stream comprising a parameter indicative of a number of pictures of the encoded picture stream arranged to be buffered in a decoder that is sufficient to recover the output order of decoded pictures in the unified picture buffer when decoded pictures are input to buffering in decoding order, pictures being defined as reference pictures or non-reference pictures, and information relating to decoding order and output order of a picture is defined for pictures of the picture stream, the at least one memory and the computer program code configured to, with the at least one processor, cause the encoder to perform at least to perform the following before inserting a newly decoded picture to the buffer:

examine if the newly decoded picture can be inserted in the unified picture buffer without removing another picture from the unified picture buffer, based on said examination, if the newly decoded picture cannot be inserted in the unified picture buffer without removing another picture from the unified picture buffer, select a picture in the unified picture buffer which is not used as a reference picture and which has already been output from the unified picture buffer, and if such a picture was selected, remove the picture from the unified picture buffer.

11. The encoder according to claim 10, the at least one memory and the computer program code configured to, with the at least one processor, cause the encoder to define:

a first attribute indicating a number of reference pictures in the buffer, and a second attribute indicating a number of pictures arranged to be buffered in decoding order that is sufficient to recover the output order of pictures in the buffer.

12. A method in an encoder for forming an encoded picture stream of encoded pictures, the pictures having a type, wherein pictures of any type may be defined as reference pictures, the method in the encoder comprising:

declaring and indicating in the encoder that the pictures are reference pictures or non-reference pictures, defining information in the encoder relating to decoding order and output order of pictures of the picture stream, and determining for the encoded picture stream a number of decoded pictures arranged to be buffered in decoding order in a unified picture buffer of a decoder that is sufficient to recover the output order of the decoded pictures when the same unified picture buffer of the decoder is used for storing and reordering both decoded pictures that are referenced by one or more un-decoded pictures and decoded non-reference pictures of the encoded picture stream; and defining an indication of said number in the encoder.

13. The method according to claim 12, further comprising:

forming in the encoder a signal such that if the signal were processed by a hypothetical decoder for hypothetically decoding an encoded picture stream, the pictures would then be defined as reference pictures or non-reference pictures, and information relating to decoding order and output order of a picture would also be defined for pictures of the picture stream, the hypothetical decoder comprising a unified picture buffer for buffering decoded reference pictures and decoded pictures to be reordered, and a processing block for performing the following before inserting a newly decoded picture to the buffer:

examining in the encoder if the newly decoded picture can be inserted in the buffer without removing another picture from the buffer, based on said examination, if the newly decoded picture cannot be inserted in the buffer without removing another picture from the buffer, selecting in the encoder a picture to be removed from those pictures in the buffer which are not used as reference pictures and which have already been output from the buffer, if a picture was selected, removing in the encoder the selected picture from the buffer.

14. A method in a decoder, comprising:

buffering in the decoder decoded pictures, the pictures having a type, wherein pictures of any type may be defined as reference pictures, receiving in the decoder a parameter indicative of a number of decoded pictures arranged to be buffered in a unified picture buffer that is sufficient to recover the output order of decoded pictures in the unified picture buffer when decoded pictures are input to buffering in decoding order, defining in the decoder a buffer size for the unified picture buffer on the basis of the received parameter, defining in the decoder a number of decoded reference pictures in the buffer, declaring and indicating that the decoded pictures are reference pictures or non-reference pictures, and using in the decoder the unified picture buffer for buffering both decoded pictures that are referenced by one or more un-decoded pictures and decoded non-reference pictures for arranging them in output order.

15. The method according to claim 14, further comprising defining in the decoder a number of pictures to be buffered in decoding order that is sufficient to recover the output order of pictures.

16. The method according to claim 15, the decoder configured to output pictures using information relating to said number of pictures arranged to be buffered in decoding order that is sufficient to recover the output order of pictures, and the method comprising performing in the decoder the following before inserting a newly decoded picture to the buffer:

examining in the decoder if the newly decoded picture can be inserted in the buffer without removing another picture from the buffer, based on said examination, if the newly decoded picture cannot be inserted in the buffer without removing another picture from the buffer, selecting in the decoder a picture to be removed from those pictures in the buffer which are not used as reference pictures and which have already been output from the buffer, if a picture was selected, removing in the decoder the selected picture from the buffer.

17. A decoder, comprising:

means for buffering decoded pictures in a unified picture buffer, the decoded pictures having a type, wherein pictures of any type may be defined as reference pictures;

means for defining a buffer size and a number of decoded reference pictures in the buffer, wherein the buffer includes a unified picture buffer for buffering both decoded pictures that are referenced by one or more un-decoded pictures and decoded non-reference pictures;

means for defining a number of decoded pictures arranged to be buffered in the unified picture buffer in decoding order that is sufficient to recover the output order of the pictures;

means for arranging decoded reference pictures and decoded non-reference pictures in said unified picture buffer in output order; and means for declaring and indicating that the pictures are reference pictures or non-reference pictures.

18. The decoder according to claim 17, further comprising:

means for outputting pictures using information relating to said number of pictures arranged to be buffered in decoding order in a unified picture buffer of variable size that is sufficient to recover the output order of pictures; and a processing block for performing the following before inserting a newly decoded picture to the buffer:

examining if the newly decoded picture can be inserted in the buffer without removing another picture from the buffer, based on said examination, if the newly decoded picture cannot be inserted in the unified picture buffer without removing another picture from the buffer, selecting a picture in the buffer which is not used as a reference pictures and which has already been output from the buffer, if such a picture was selected, removing the selected picture from the buffer.

19. The decoder according to claim 18, wherein the decoder is configured to not remove undisplayed pictures.

20. The decoder according to claim 17, further comprising:
means for defining a buffer size; and
means for defining a number of pictures to be used as reference pictures.

21. The decoder according to claim 20, wherein at any particular moment said number of pictures arranged to be buffered in decoding order that is sufficient to recover an output order of pictures is defined so that a sum of the number of pictures used as reference pictures and said number of pictures arranged to be buffered in decoding order which are not used as reference pictures is less than or equal to the size of the buffer.

22. The decoder according to claim 17, wherein before a newly decoded picture is inserted to the buffer one picture is removed from the buffer, and the picture to be removed is selected from those pictures in the buffer which are not used as reference pictures and which has already been output from the buffer.

23. The decoder according to claim 17, a number of pictures arranged to be buffered in decoding order that is sufficient to recover the output order of pictures is defined, wherein the number of pictures arranged to be buffered in decoding order that is sufficient to recover the output order of pictures is defined so that a sum of the number of pictures used as reference pictures and the number of pictures, which are arranged to be buffered in decoding order that is sufficient to recover the output order of pictures, and which are not used as reference pictures is less than or equal to the size of the buffer.

24. The decoder according to claim 17, a number of pictures arranged to be buffered in decoding order that is sufficient to recover the output order of pictures is defined, wherein the size of the buffer is defined so that a sum of the number of pictures used as reference pictures and the number of pictures arranged to be buffered in decoding order which are not used as reference pictures is less than or equal to the size of the buffer.

25. A non-transitory computer-readable memory encoded with program code for execution by a processor for causing an apparatus to:

decode an encoded picture stream, pictures of the picture stream being defined as reference pictures or non-reference pictures, and information relating to decoding order and output order of a picture is defined for pictures of the picture stream, buffer decoded pictures that are referenced by one or more un-decoded pictures and decoded non-reference pictures to be reordered in a unified picture buffer of a variable size, receive a parameter indicative of a number of decoded pictures arranged to be buffered in the unified picture buffer that is sufficient to recover the output order of decoded pictures in the picture buffer when decoded pictures are input to buffering in decoding order, and also perform the following before insertion of a newly decoded picture to the unified picture buffer:

examine if the newly decoded picture is insertable in the unified picture buffer without removal of another picture from the unified picture buffer, based on said examination, if the newly decoded picture is not insertable in the unified picture buffer without removal of another picture from the buffer, select a picture in the unified picture buffer which is not used as a reference picture and which has already been output from the buffer, and if such a picture was selected, remove the selected picture from the unified picture buffer.

26. A non-transitory computer-readable medium storing machine executable instructions for:

buffering decoded pictures, the pictures having a type, wherein pictures of any type may be defined as reference pictures, receiving a parameter indicative of a number of pictures arranged to be buffered in a unified picture buffer that is sufficient to recover the output order of pictures in the unified picture buffer when decoded pictures are input to buffering in decoding order, defining a size of a buffer and a number of decoded reference pictures in the buffer, declaring and indicating that the decoded pictures are reference pictures or non-reference pictures, and buffering both decoded pictures that are referenced by one or more un-decoded pictures and decoded non-reference pictures for arranging them in displaying order in the unified picture buffer.

* * * * *